United States Patent [19]

Billings

[11] Patent Number: 5,135,578
[45] Date of Patent: Aug. 4, 1992

[54] METHOD OF CLEANING OIL SLICKS AND CHEMICAL SPILLS

[76] Inventor: Lanny D. Billings, R.R. 1, Orchard, Nebr. 68764

[21] Appl. No.: 522,671

[22] Filed: May 12, 1990

[51] Int. Cl.$^5$ .............................................. B08B 7/04
[52] U.S. Cl. ...................................... 134/7; 134/25.1; 210/680; 210/691; 210/924
[58] Field of Search .................. 134/7, 25.1; 210/680, 210/691, 924

[56] References Cited

U.S. PATENT DOCUMENTS 4,959,154 9/1990 Simmons .................................. 134/7

Primary Examiner—Asok Pal
Attorney, Agent, or Firm—Law Offices of John A. Beehner

[57] ABSTRACT

A method of cleaning oil slicks or chemical spills on a body of water or on the ground or other floor surface is disclosed. The method includes spreading a poplar bark-based product either onto a floating net on a body of water or onto oil or a chemical spill on a ground surface and absorbing the oil or chemical into the product. The soaked product may then be removed and a substantial portion of the oil or spilled chemical is recoverable from the product, such as by compressing it. The product may be spread onto a beach or shoreline for cleaning up a prior oil spill or the product may be spread on a clean beach or shoreline to protect it from contamination by any future oil slicks or chemical spills. The poplar bark-based product may be placed in flexible elongated socks for convenient handling for cleaning smaller spills from a surface.

34 Claims, 5 Drawing Sheets

METHOD OF CLEANING OIL SLICKS AND CHEMICAL SPILLS

BACKGROUND OF THE INVENTION

The present invention is directed generally to a method of cleaning an oil slick or other chemical spill from a body of water or a surface, as well as to a method of protecting a shoreline from contamination by a floating oil slick or other chemical spill. The invention is based upon the use of highly absorbent poplar bark-based product which is additionally effective for controlling odor from such spills.

The need for an improved method of protecting shorelines from oil spills at sea was dramatically emphasized by the recent tragedy when the Exxon Valdez Oil Tanker plowed into a reef and dispersed an oil slick that has heavily or moderately oiled up to one hundred seventeen (117) miles of coast line in Prince William Sound and along the gulf of Alaska. $1.8 billion has reported been spent on the clean-up to date, which has been largely ineffective. Four hundred twenty (420) shoreline clean-up workers have been hired to use more than two hundred fifty (250) ships and boats, three hundred fifty thousand (350,000) feet of boom and fifty-four (54) skimmers in open waters. Warehouses are stacked with rows of absorbent pads, tons of hoses and hundreds of generators. Nevertheless, only twenty-one thousand (21,000) bbl. of oil, barely nine percent (9%) of the two hundred forty-thousand (240,000) bbl. that were spilled, have been recovered.

The toll on wildlife resulting from the Exxon Valdez oil spill alone has been immeasurable. Sea birds and water fowl, especially diving birds, have been hit hard. Surveys taken the first week after the disaster turned up less than one-third (⅓) of the twenty-two thousand (22,000) grebes, cormorants, diving ducks, gulls, murres, murrelets, and guillemots normally found in the Sound at this time of year. Oiled birds have been spotted one hundred twenty-five (125) miles away, near Anchorage. Whereas, whales, seals and sea lions, which insulate themselves with fat rather than feathers or fur, have fared better than the birds or otters, they are consuming oil contaminated food.

Further down the food chain, the spill poses a continuing threat to the fifty-five thousand (55,000) tons of herring and the one billion (1,000,000,000) salmon fry in Prince William Sound this Spring. The entire herring fishery has been closed. Loss of a salmon harvest could cause fishermen one hundred million dollars ($100,000,000). Even if the oil doesn't destroy their food, it could slow the fish's growth or make it impossible for them to smell their way to their spawning grounds. Large stocks of shrimp, black cod, rock fish, and halibut could be damaged too. Clams and mussels may survive the onslaught, but hydrocarbons will accumulate in their body tissues endangering any species that feeds on them.

Worst yet, the problems caused by such oil spills are somewhat Catch-22. Leaving the shore dirty could cause years of ecological damage. On the other hand, thoroughly cleansing the shore, whether with chemicals or pressurized water, could erode beaches and kill off countless organisms that live near the tide line.

Many additional oil spills have been reported since the Exxon Valdez disaster. Furthermore, the nineteen million (19,000,000) acres of tundra and mountains the Arctic National Wildlife Refuge in the Northeast of Alaska are being endangered by the petroleum industry's claim that that ground is the industry's last hope for another major on shore petroleum discovery in Northern Alaska. The threatened destruction of this last untouched stretch of Arctic coastal plane by development for oil drilling poses an equal threat to the shorelines of the sea on which such oil would be transported.

Accordingly, there is an imminent need for an effective method for cleaning present oil spills and protecting clean shoreline from being ravaged by future spills. Even apart from the dramatic need for a method of cleaning oil slicks, it is estimated that every year, Americans throw away or dump used oil equivalent in quantity to thirty (30) Exxon Valdez spills.

Besides oil, there is a similar need for cleaning spills of all kinds of other chemicals, including gas by-products, industrial chemicals and fertilizers to just name a few. In the past, clean-up operations at spill sites of such chemicals have often used a loose clay absorbent because of its apparent low cost. But according to the Sorptive Minerals Institute, the trade organization for clay producers, loose clay can only absorb ten (10) to fifteen percent (15%) by weight of its capacity and still be a functional product. Based on a ten percent (10%) absorbency rate, this means that for every five (5) gallons of waist generated, or for every five gallons of hydraulic fluid that drips out of a machine, you need more than nine (9) fifty pound (50) bags of clay chips, i.e., cat litter, or approximately four hundred fifty (450) pounds of loose material, to clean-up the spill. The labor, handling and disposal of that mass of material renders the clay chips an ineffective solution to the problem of cleaning up chemical spills.

Accordingly, a primary object of the invention is to provide improved methods for cleaning up spills of oil or other chemicals on water or land, as well as to provide a method of protecting shorelines from contamination by floating spills of oil or other chemicals.

Another object of the invention is to provide such a method which uses all natural materials which are readily available in abundant quantities.

Another object is to provide such a method which utilizes the absorbency of poplar bark-based products both to absorb chemicals and to control odors produced thereby.

Another object is to provide such a method for containing and supporting the poplar-based product for use at sea.

Another object is to provide such a method which enables the recovery of a substantial portion of the oil or other chemicals that are cleaned up.

Another object is to provide a method of containing and arresting the spread of a spill of oil or other chemicals on land or water.

Another object is to provide such a method which stabilizes a spill, provides a surface that helps test wildlife from the oil or other chemical, and enables clean-up to be conducted at a slower more organized pace without further damage to the environment.

Another object is to provide such a method which is environmentally safe, economical and efficient in operation.

SUMMARY OF THE INVENTION

The method of cleaning a floating chemical spill on a body of water according to the present invention includes such steps as providing a quantity of poplar bark-based pelleted product, floatation means and a flexible net having openings generally smaller than the smallest whole pellet dimension of the pelleted product and spreading the net over a chemical spill on the body of water. The floatation means is connected to the net for supporting it adjacent the surface of the body of water. The poplar bark-based pelleted product is spread out on the net for absorbing the floating chemical spill into the product. The net and chemical soaked product can then be dragged or lifted from the body of water leaving little, if any, residue of the chemical spill. A substantial portion of the chemical can be recovered from the soaked product, such as by compressing the product and collecting the chemical squeezed therefrom. The net used in the above described method preferably has a generally continuous rim adjacent the other periphery thereof, which rim is adapted to have a plurality of separate floats secured to it at spaced apart positions therealong. Some type of elongated compression member such as an elongated rod may span the net for maintaining its shape on rough waters. For large scale clean-up operations, the poplar bark-based pelleted product may be dropped onto the net from an airplane.

The method of the invention furthermore contemplates cleaning chemical spills from ground or floor surfaces by spreading the poplar bark-based pelleted product over the chemical spill, absorbing the chemical into the pelleted product and removing the chemical soaked product from the surface. It is often advantageous to press the pelleted product into the chemical spill by directing a roller over the surface of the poplar bark-based product. Since the poplar bark-based product is capable of absorbing its weight in oil or other chemicals, the quantity of product that is spread over a given area is selected as equal to the approximate weight of the chemical spill in that given area. The poplar bark-based product may be provided in granular or pelleted form, or even as fines. For optimum odor control of a chemical spill, a substantial portion of the poplar bark-based product should include aspen bark.

The above described method is particularly designed for use in cleaning up oil contaminated shorelines and beaches. Rocky surfaces may be best treated by filling the spaces between and around the rocks with poplar bark-based product and then covering the rocks with product provided in a generally flat pulverized form.

Finally, the method of the invention is directed to protecting a shoreline from contamination by a floating chemical spill before that spill has reached the shoreline. This is done by covering an elongated length of the shoreline adjacent the water's edge with the poplar bark-based product so that any chemical spill that reaches the shoreline will be deposited onto the product and substantially absorbed by it. The product may be either spread in a thin covering layer or arranged along the waters edge in the form of an elongated raised derrick to stop and absorb the chemical before it reaches the more inland portion of the beach or shoreline.

The methods of the invention enable recovery of the spilled oil or chemical from the poplar bark-based product since it can be compressed therefrom. As important, the methods of the invention enable immediate stabilization of any such spill, whether on land or at sea, by providing a surface that is safe for wildlife and which contains the oil or chemical for later clean-up at a slower and more organized pace without damage to the environment in the meantime. Finally, effective odor control is a unique feature of the method of the invention. For this purpose, it is preferred that the poplar bark-based product include a substantial portion of aspen bark.

DESCRIPTION OF THE PREFERRED EMBODIMENT

The method of cleaning oil slicks or other chemical spills on either a body of water or a ground or floor surface is based upon the effective high absorbency property of poplar bark-based products. "Poplar" is used generically to refer to any bark or wood of a tree in the poplar family, such as aspen, poplar and cottonwood. Aspen bark, in particular, is highly absorbent and effective for controlling odors from oils or other chemicals that it may absorb.

Aspen trees are common in all of Canada, and are widespread throughout the uplands and mountains of North America. The bark of the young aspen trees is yellowish-green, or nearly white, but turns dark brown to black as the tree ages. The quaking aspen is important in natural reforestation. Since it develops quickly, it is often the first growth on burnt over land thereby protecting the young stages of more permanent trees.

Aspen wood is commonly used for pulp, boxes, crates, excelsior and matches. It is a source of winter feeding for the carabao and deer in the northern regions. The inner bark contains an ingredient that acts as a pain reliever. The deer and carabao and known to feed on this inner bark after birthing, to act as a healer. The bark of the aspen is thought to act as a neutralizer for odors.

As logging operations increase for harvesting and converting trees into useful things, much bark, sawdust, shavings, and wood scraps are produced. The methods of the present invention afford a profitable use of such bark and wood byproducts from trees of the poplar family. As this nation becomes increasingly dependent upon its forests, the need to get maximum use from the annual timber harvest becomes increasingly vital.

Figure 1:
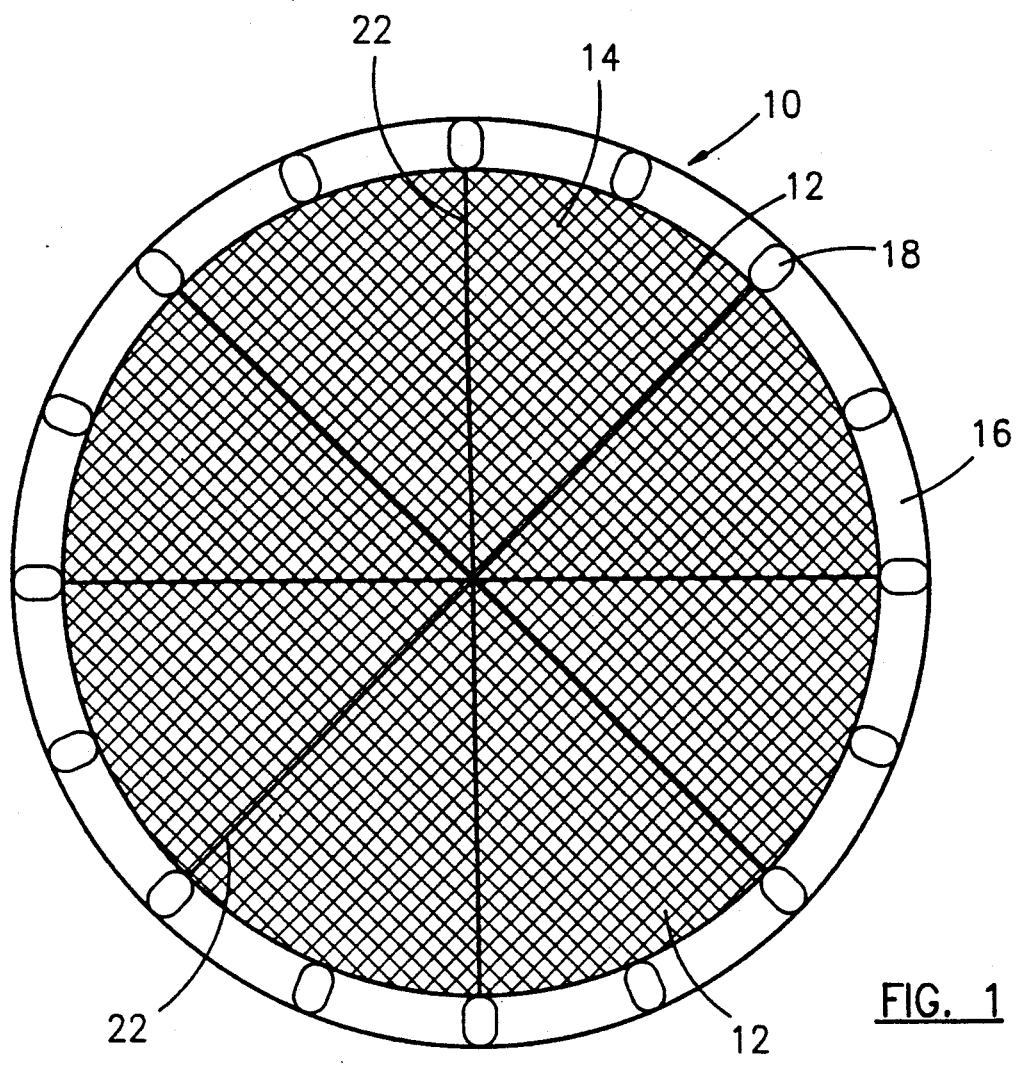
FIG. 1 is a top plan view of a net for supporting poplar bark-based product on a body of water.
Figure 2:
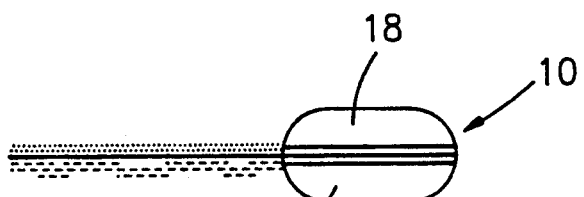
FIG. 2 is a side view of the net supporting pelleted product on a chemical spill.
Figure 2A:
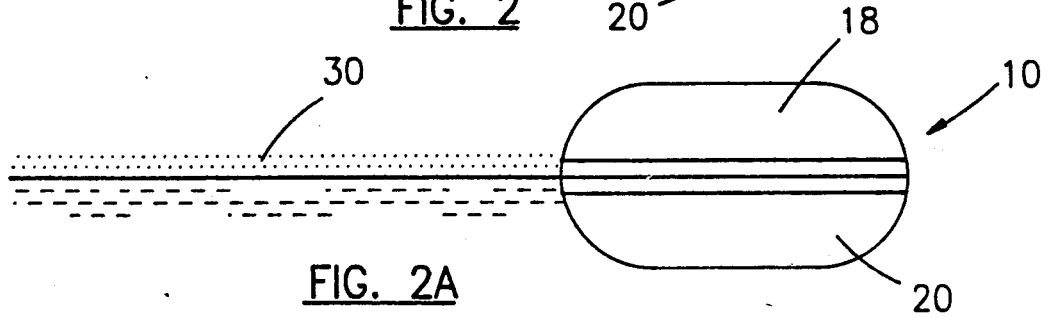
Figure 3:
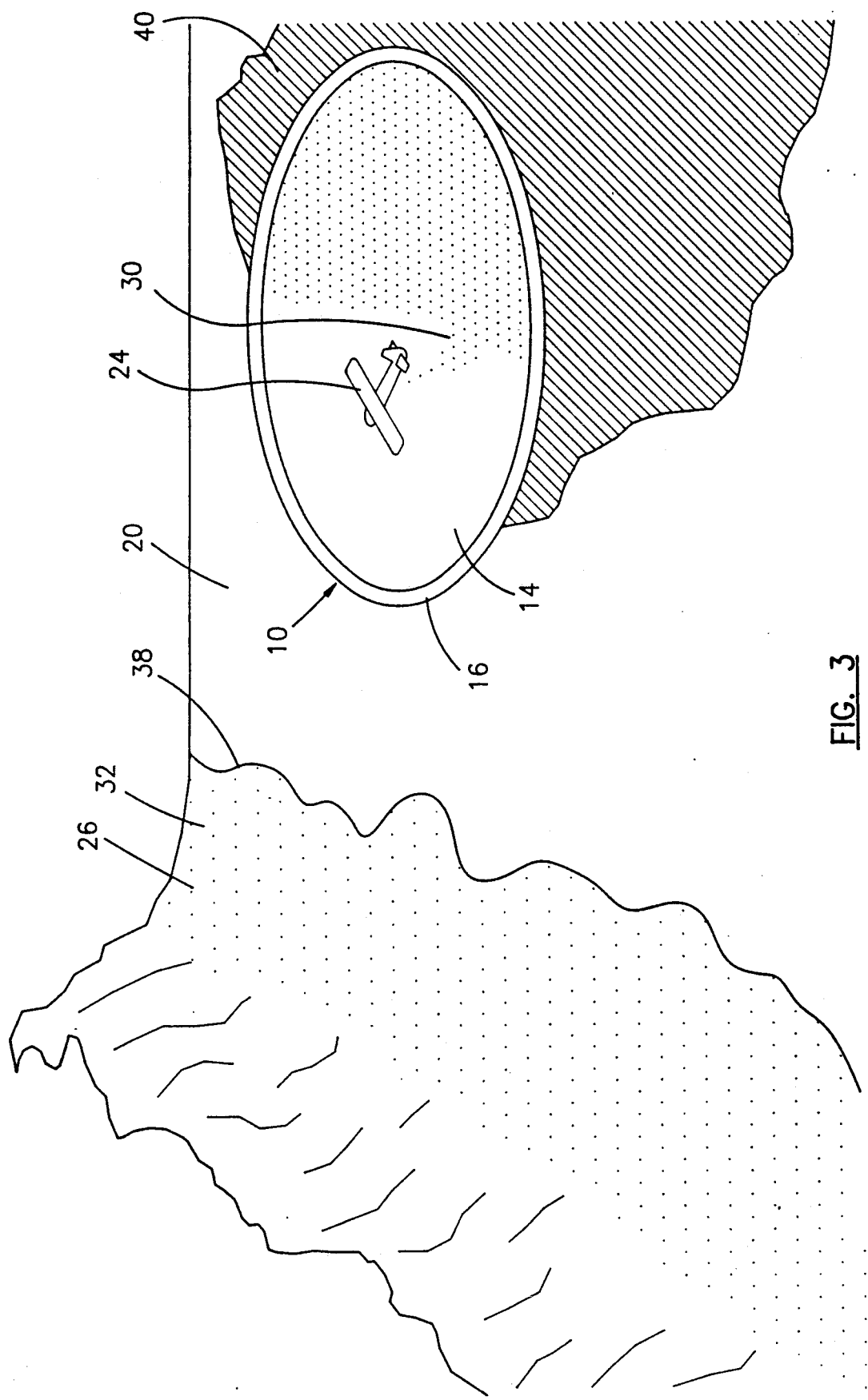
FIG. 3 is a diagrammatic perspective view of an airplane dropping poplar bark-based pelleted product onto a floating net.

The present invention provides a practical solution to cleaning up such notorious oil spills as those mentioned above. The ideal situation would be to contain and remove a large oil slick from a body of water before it ever reaches the shore. This may be accomplished by the present invention by providing a flexible net 10, as illustrated in FIG. 1, of a size adapted to the particular oil slick or other floating chemical spill. A single net need not cover an entire oil slick since several nets may be spread over the slick in adjacent relation to facilitate both placement of the nets and removal of the oil slick from the surface of the water. Net 10 includes multiple sections 12 of netting material 14 connected together and surrounded by a generally continuous flexible rim 16 of fabric or the like adjacent the outer periphery of the net. A plurality of primary floats 18 are secured to the rim for supporting it on the surface of the water. Floats 18 are arranged in spaced apart relation about the rim 16. A plurality of secondary floats 20 may be arranged between the primary floats and On the underside of rim 16 to hold the top of the rim 16 on the top of the water. A plurality of rods 22 may span the net 10 o to help maintain its shape on rough wavy waters. The nets may be rushed to an oil slick aboard boats from which they may be cast onto the oil slick. For large oil slicks, poplar bark-based product may be dropped onto the nets from an airplane 24 or otherwise dispersed onto the net from a ship. The poplar bark-based product will absorb the oil slick for other floating chemical spill and remain contained on the net or lifting from the water or towing to a removal site. A particular advantage of the method of the invention is that the oil or other spilled chemical may be recovered from the product, such as by compressing the oil soaked product.

The effectiveness of the invention was illustrated in an experimental example wherein a tight knit net was attached to a circular floatation device that was floatably supported on a body of water so that the edge of the circle was just above the surface of the water. Table salt was used to make a five percent (5%) salt solution to simulate sea water. Seventy (70) grams of number two (2) crude oil was poured into the center of the net. Initially, aspen bark-based pelleted product weighing ten percent (10%) of the crude oil was placed onto the net but proved insufficient. Additional product was added until the desired effect was achieved. The amount of product needed to absorb seventy (70) grams of crude oil was seventy (70) grams of product for a one to one ratio by weight. During absorption of the oil by the product, it was noted that the oil was being pulled back into the net area by attraction of the product. Accordingly, the net need not cover an area as large as the oil slick to absorb oil beyond its boundaries. In the example, approximately 97.5% (plus or minus 2%) of the crude oil was recaptured by absorbency of the pelleted product. It is, therefore, expected that at least ninety percent (90%) of the crude oil could be recovered from the pellets which could thereafter be safely incinerated to dispose of the waste and remaining 7.5% of the oil contained in them. Upon removal of the net from the water, the oil remaining on the surface represented 2.5% (plus or minus 0.5%) of the original seventy (70) grams. Additional pellets were added to what was left of the oil on the surface and it was observed that the heavier oil was attracted to the pellets. In approximately fifteen (15) minutes, the pellets had absorbed 1.5% (plus or minus 0.5%) of the thicker oil and sunk to the bottom, thus leaving a much lighter clearer oil at the surface. If 97.5% of an oil spill can be absorbed and ninety percent (90%) of the spill can be recovered from the poplar bark-based product, it is expected that millions of dollars can be saved by preventing the loss of oil and eliminating the need for other expensive ineffective clean-up operations. The positive impact on the environment resulting from effective clean-up of oil slicks and other floating chemical spills is believed to be immeasurable.

Even taking into account adverse weather conditions and the time it may take for recovery equipment to be moved into place around an oil slick, a realistic estimate of recovery may be approximately eighty percent (80%). Under ideal conditions and quick availability of equipment and product, ninety percent (90%) recovery would be a realistic possibility. Dispersing the poplar bark-based product by airplane onto the nets may save valuable time.

The method of the invention is additionally directed to cleaning an oil slick or chemical spill from a surface such as a shoreline, beach or any other ground or floor surface. The method contemplates spreading the poplar bark-based product over the spill, absorbing the spill into the pelleted product and then removing the chemical soaked product from the surface. The spill is preferably to be substantially covered with pelleted product, the quantity of which to be spread over a given area being selected as a function of the approximate weight of the chemical in that area. "Chemical" is broadly used herein to refer to oil, gas byproducts, industrial chemicals, fertilizers or any other such chemical spills that may need to be cleaned up from a surface. It is preferred that the weight of product distributed onto a given area is equal to the approximate weight of the chemical spill in that area.

It has been found that the effectiveness of the method of the invention is increased by pressing the poplar bark-based product into the oil or chemical spill. On a beach or extended shoreline, this may be done by directing a roller over the surface of the product to press it into the ground. Even if removal of the oil soaked product from an extended shoreline is not practical, the absorption of the oil or other chemical into the poplar bark-based product forms a surface that is safe for wildlife and which controls any odors from the spilled oil or chemical. Damage to the environment and wildlife would thus be immediately arrested and clean-up operations could then be attended to at a much slower or organized pace.

Figure 4:
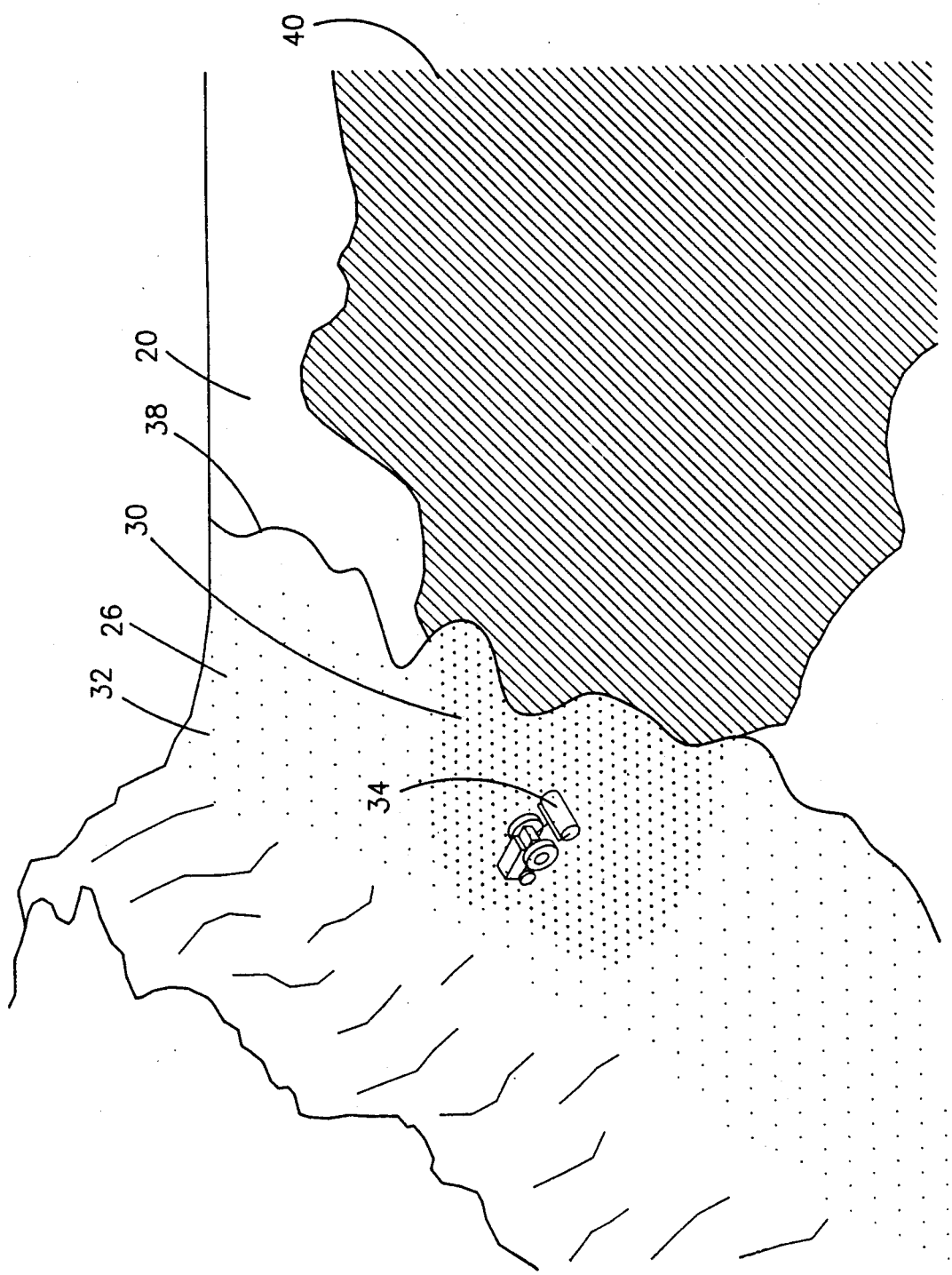
FIG. 4 is a perspective view of poplar bark-based product being spread onto and pressed into a shoreline surface.

FIG. 4 illustrates a beach 26 adjacent a body of water 28. Poplar bark-based product 30 has been spread over the surface of the sand 32 and is being pressed into the sand by a roller 34.

In an experimental example, a glass plate was covered with sand approximately three quarters of an inch (¾") thick, an area of which was then saturated with one hundred five (105) grams of number two (2) crude oil. One hundred five (105) grams of the poplar bark-based product was weighed out and spread onto the sand to completely cover the oil. Twenty-nine (29) hours later, little change or absorption was found. Upon pressing the product into the sand and oil, and thereby making much better contact, a radical change in absorption occurred over the next eight (8) hours. The experiment continued for seven (7) more days and further absorption was noted each day. The best absorption occurred in an area where the poplar bark-based product was pressed completely into the sand and oil. An interesting observation was the absence of any odors from the oil. By adding sufficient product, the odor was that of fresh aromatic wood shavings.

From this experiment, it is concluded that one could cover sand beaches with the poplar bark-based product and roll it into the sand. This process would continue until the sand was completely covered, thereby, making a surface dominated by the product. This would accomplish two very important goals, namely (1) to protect wildlife and the environment and (2) to cut the odor of the oil.

Another experiment involved the cleaning of oil covered rocks. A group of rocks were covered with number two (2) crude oil until one hundred percent (100%) covered. A test was conducted over a seven (7) day period. Poplar bark-based product was placed around, between and over the rocks. A considerable amount of oil was absorbed, mostly from around and in between the rocks. On the third day, pelleted product was brushed away from some of the rocks and replaced by pulverized poplar bark-based product. The brushed away pellets were taken and ground into a powder. That pulverized powder product was placed on one rock. The results were that the rock become very dry to the touch with no oil being picked up by one's hand. Since the rock covered with pulverized product was cleaner than the rest, the experiment was continued for another twenty-four (24) hours with pulverized product covering all of the rocks. The results were rewarding, showing excellent improvements in absorbency. It was concluded that a flat washer shaped product or pulverized product will best absorb oil off of rocks at a more effective rate. Again, no oil odor was observed at the end of the experiment.

In a further experiment, poplar bark-based product was formed in a derrick around white marble rocks to see if oil run off could be contained. The rocks were oversaturated with oil so that the oil would run into the simulated derrick. The rocks were then covered completely with pulverized poplar bark-based product. There was a lot of absorption of oil from around the rocks. After ninety-six (96) hours, the fines were removed, but some rocks were still quite dark and covered with oil. More fines were added to cover the rocks completely. Upon removal twenty-four (24) hours later, the results were much different. The rocks were dry to the touch. The derrick proved quite effective for containing oil within its perimeter. The derrick stopped the oil and continued to absorb the oil within its perimeter continuously over a seventy-two (72) hour period. Again, odors were completely absorbed thus providing a significant advantage for use of the method where housing and population can be affected.

It was apparent that the method of the invention was not only useful for cleaning up existing oil slicks and chemical spills on beaches and other shorelines, but also that such beaches and shorelines could be protected in advance of an approaching oil slick to protect that beach or shoreline from contamination if and when the oil slick reaches it. Building large derricks out of the absorbent poplar bark-based product along the shoreline could save millions of dollars in clean-up and preserve the clean environment. Alternatively, the poplar bark-based product can be spread onto a beach surface and pressed or otherwise rolled into it to protect it against the adverse effects of any future oil slicks or chemical spills that may be directed onto the shore.

Figure 5:
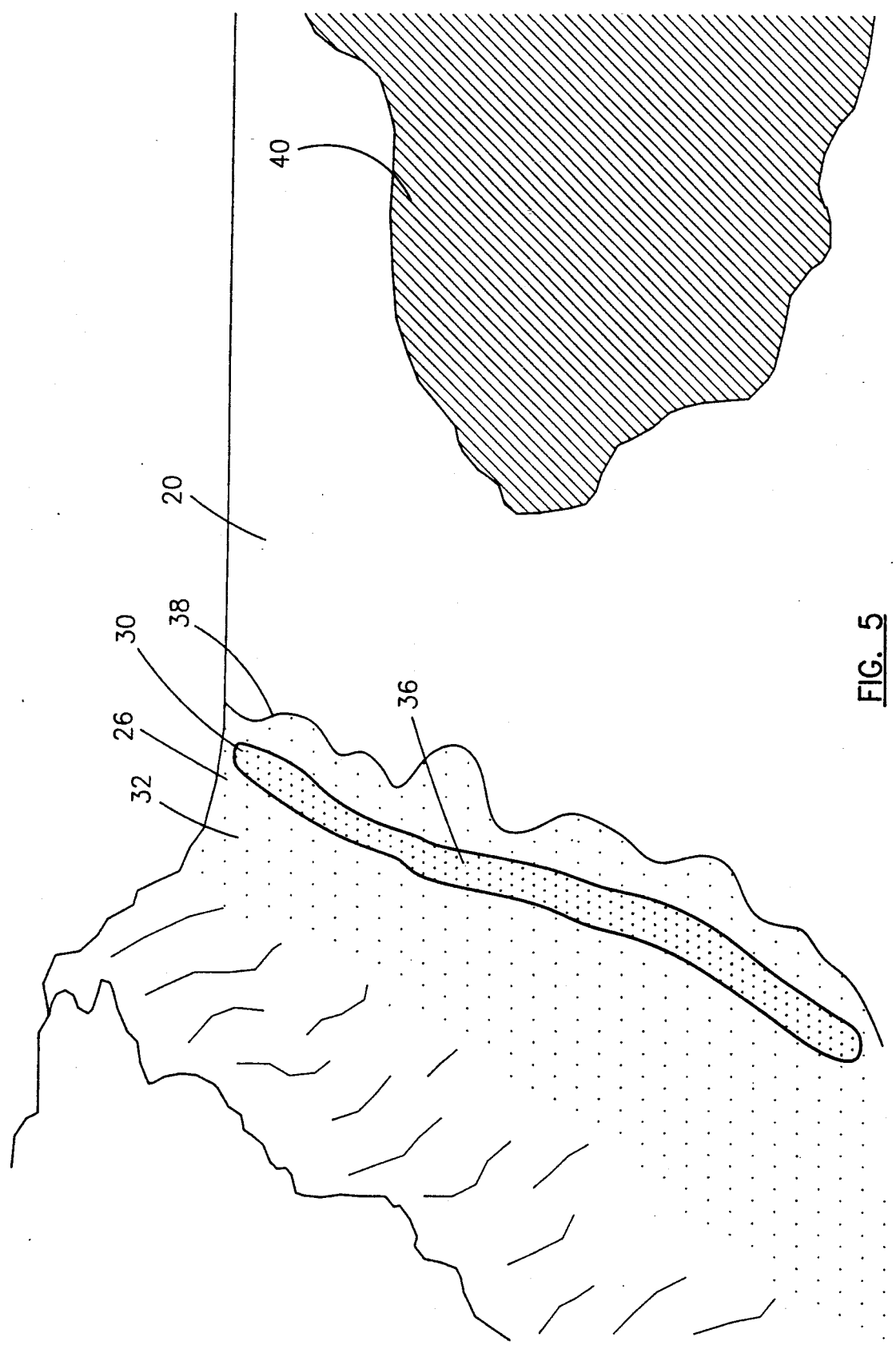
FIG. 5 is a perspective view of poplar bark-based pelleted product arranged in an elongated derrick along a shoreline.

FIG. 5 illustrates an elongated derrick 36 of the poplar bark-based product along the water's edge 38 of beach 26 for protecting it from an advancing oil slick 40.

Figure 6:
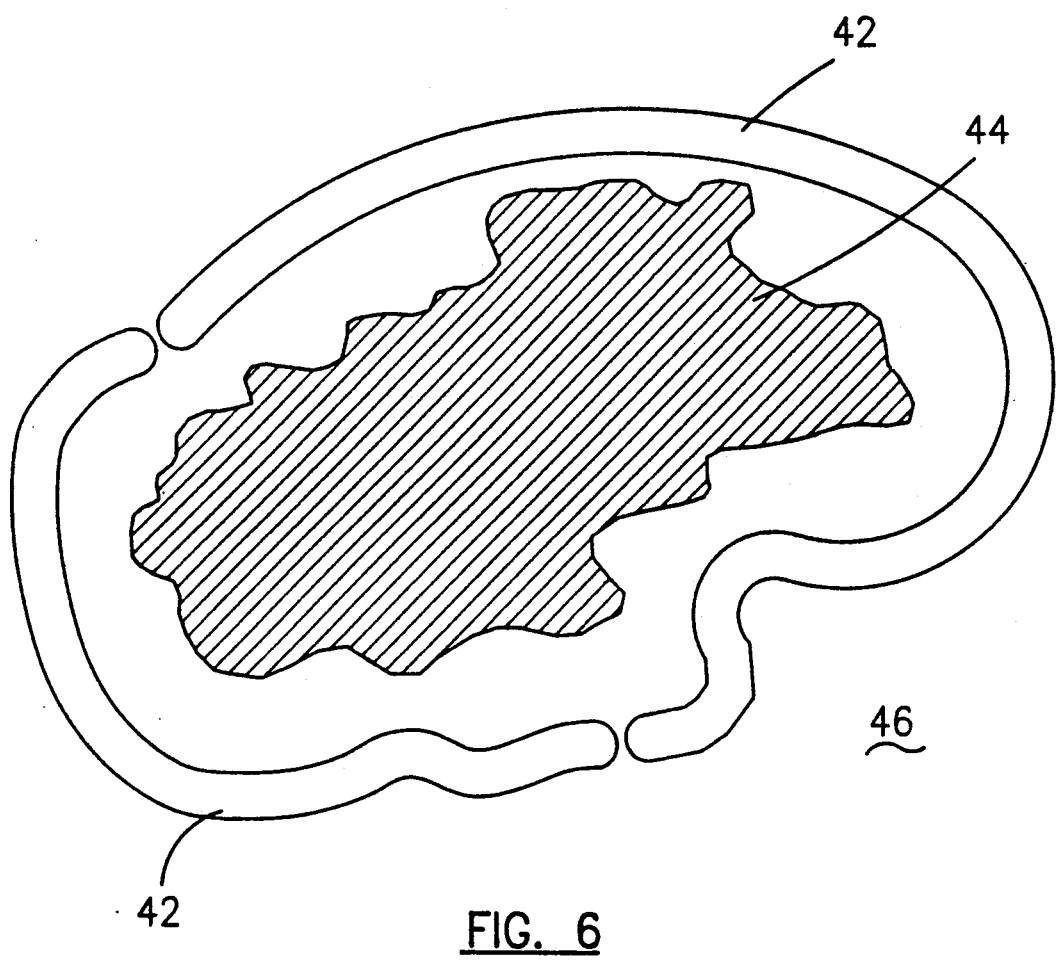
FIG. 6 is a perspective view showing several elongated socks of poplar bark-based pelleted product arranged around a chemical spill on a surface.

Handling of the poplar bark-based product may be simplified for cleaning up spills of oil or chemicals in auto service centers, factories, and around machines by containing the product within elongated tubular socks. The socks can simply be arranged end to end around a spill to contain it from spreading and they can be converged onto the spill to absorb it for recovery or disposal. Socks are available in various materials. A preferred sock is made of corn products similar to those used for milk filters so as to produce a sock that is as biodegradable as the natural poplar bark-base product that it contains. FIG. 6 illustrates several socks 42 arranged end to end around a spill 44 on a floor surface 46. The sizes of the socks 42 may vary greatly but typical socks may be approximately one and a half to two inches (1½-2") in diameter by three (3) feet in length.

The process for preparing the poplar bark-based product for the invention in either pelleted or granular form is described in Billings U.S. Pat. No. 4,788,936, issued Dec. 6, 1988. Briefly, the product is formed from hardwood from the poplar family, preferably aspen, which product includes bark as a substantial element thereof. The bark content of the pellets is preferably between five (5) and forty-five percent (45%) by volume, with the balance being a combination of sawdust, ground wood chips and ground lumber. The preferred pellet product has a moisture content of between five (5) and fifteen percent (15%). Granular product may be configured like coffee grounds whereas pelleted product may range in size from a width of between approximately one sixteenth inch (1/16") and three quarter inches (¾") and a length of between approximately one eighth inch (⅛") and three quarter inch (¾"). The resulting product will absorb at least its own weight in oil and other chemical spills and it has been found to be remarkably effective for absorbing and eliminating odors.

Whereas the invention has been shown and described in connection with preferred embodiments thereof, it is understood that many modifications, substitutions and additions may be made which are within the intended broad scope of the appended claims. Thus there has been shown and described methods of cleaning oil slicks and chemical spills which accomplish at least all of the stated objects.

I claim:

1. A method of cleaning a floating chemical spill on a body of water comprising,
   providing a quantity of poplar bark-based pelleted or granular product, flotation means and a flexible net having openings generally smaller than the smallest whole pellet dimension of said pelleted product,
   spreading said net over a chemical spill on said body of water,
   connecting said floatation means to said net thereby supporting said net adjacent the surface of said body of water,
   placing said poplar bark-based product on said net,
   absorbing said floating chemical spill into said product, and
   removing the chemical soaked product from said body of water.

2. The method of claim 1 further comprising recovering a substantial portion of the chemical from the chemical soaked product.

3. The method claim 2 wherein said recovering step comprises compressing the chemical soaked product and collecting the chemical squeezed from the compressed product.

4. The method of claim wherein said net includes a generally continuous rim adjacent the outer periphery thereof, said floatation means being connected to said outer rim.

5. The method of claim 4 wherein said floatation means comprises a plurality of separate floats secured to said continuous rim at spaced apart positions therealong.

6. The method of claim 1 wherein said poplar bark-based pelleted or granular product is dropped onto said net from an airplane.

7. The method of claim 1 further comprising removing said net and chemical soaked product together from said body of water.

8. The method of claim 1 wherein said chemical spill comprises an oil slick.

9. The method of claim 1 wherein said poplar bark-based pelleted or granular product comprises aspen bark-based pelleted or granular product.

10. A method of cleaning a chemical spill from a surface, comprising,
   providing a quantity of poplar bark-based pelleted or granular product, said product comprising, ground poplar bark between 5 and 45% by volume, the balance being selected from a combination of sawdust, ground wood chips and ground lumber, said product having a moisture content of between 5 and 15%, and
   spreading said pelleted or granular product over aid chemical spill, absorbing said chemical spill into said pelleted or granular product, and removing the chemical soaked product from said surface.

11. The method of claim 10 wherein spreading said pelleted or granular product onto said chemical spill comprises substantially covering said spill with said pelleted or granular product.

12. The method of claim 10 further comprising selecting the quantity of pelleted or granular product to be spread over a given area of the chemical spill as a function of the approximate weight of the chemical in that area.

13. The method of claim 12 wherein said selecting step comprises selecting a weight of product equal to the approximate weight of the chemical spill in that given area.

14. The method of claim 10 wherein said poplar bark-based product includes bark and wood of a tree of the poplar family including aspen, poplar and cottonwood.

15. The method of claim 14 wherein said poplar bark-based product is provided in granular form.

16. The method of claim 14 wherein said poplar bark-based product is provided in pelleted form.

17. The method of claim 14 wherein said poplar bark-based product includes a substantial portion of aspen bark for odor control.

18. The method of claim 10 further comprising pressing said poplar bark-based pelleted or granular product into the chemical spill on said surface.

19. The method of claim 18 wherein said pressing step comprises moving a roller over said surface to compress the product into the chemical spill.

20. The method of claim 10 wherein said surface comprises a sand beach.

21. The method of claim 10 wherein said surface comprises a floor surface.

22. The method of claim 10 wherein said surface comprises a plurality of rocks.

23. The method of claim 22 wherein said spreading step comprises substantially filling the spaces between and around the rocks with said poplar bark-based product and providing said product in a generally flat pulverized form and covering the rock with said flat pulverized product.

24. The method of claim 23 wherein said flat pulverized product has a generally circular washer shape.

25. The method of claim 10 further comprising recovering a substantial portion of the chemical from said chemical soaked product.

26. The method of claim 25 wherein said recovering step comprises compressing said chemical soaked product.

27. The method of claim wherein said chemical spill comprises an oil slick.

28. The method of claim 10 further comprising providing said poplar bark-board pelleted or granular product in elongated generally tabular socks and positioning said socks to contact and absorb the chemical spill.

29. A method of protecting a shoreline from contamination by a floating chemical spill on the body of water adjacent said shoreline, comprising,
   providing a quantity of poplar bark-based pelleted or granular product, said product comprising, ground poplar-bark between 5 and 45% by volume, the balance being selected from a combination of sawdust, ground wood chips and ground lumber, said product having a moisture content of between 5 and 15%, and
   substantially covering an elongated length of the shoreline adjacent the waters edge with said product whereby any floating chemical spill that reaches the shoreline will be deposited onto said product and substantially absorbed by said product.

30. The method of claim 29 wherein said poplar bark-based, pelleted or granular product is spread over said shoreline in a thin covering layer.

31. The method of claim 30 further comprising pressing the thin covering layer of poplar bark-based pelleted or granular product into the surface of the shoreline.

32. The method of claim 31 wherein said pressing step comprises directing a roller over said shoreline.

33. The method of claim 29 wherein said poplar bark-based product is provided in pelleted form.

34. The method of claim 29 wherein said covering step comprises arranging said poplar bark-based pelleted or granular product in the form of an elongated derrick.

* * * * *